US009225855B2

(12) United States Patent
Hata

(10) Patent No.: US 9,225,855 B2
(45) Date of Patent: Dec. 29, 2015

(54) IMAGING APPARATUS, IMAGING SYSTEM, AND CONTROL METHOD FOR INCREASING ACCURACY WHEN DETERMINING AN IMAGING SCENE BASED ON INPUT IMAGE DATA AND INFORMATION STORED IN AN EXTERNAL INFORMATION PROCESSING APPARATUS

(75) Inventor: Tetsuya Hata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 13/280,620

(22) Filed: Oct. 25, 2011

(65) Prior Publication Data
US 2012/0113272 A1 May 10, 2012

(30) Foreign Application Priority Data

Nov. 4, 2010 (JP) ................................. 2010-247859

(51) Int. Cl.
*H04N 5/225* (2006.01)
*H04N 5/232* (2006.01)
*H04N 1/00* (2006.01)
*H04N 101/00* (2006.01)

(52) U.S. Cl.
CPC ....... *H04N 1/00244* (2013.01); *H04N 1/00251* (2013.01); *H04N 1/00323* (2013.01); *H04N 5/23222* (2013.01); *H04N 2101/00* (2013.01); *H04N 2201/001* (2013.01); *H04N 2201/0084* (2013.01); *H04N 2201/3253* (2013.01); *H04N 2201/3278* (2013.01)

(58) Field of Classification Search
USPC ........ 348/211.5, 211.6, 222.1, 242, 253, 256, 348/207.1
See application file for complete search history.

(56) References Cited

U.S. PATENT DOCUMENTS

| | | | |
|---|---|---|---|
| 5,086,314 A | 2/1992 | Aoki | |
| 7,831,141 B2 * | 11/2010 | Wassingbo et al. | 396/429 |
| 7,884,847 B2 * | 2/2011 | Kojima et al. | 348/22 |
| 7,924,323 B2 * | 4/2011 | Walker | 348/231.2 |
| 7,929,796 B2 * | 4/2011 | Funayama | 382/274 |
| 7,956,906 B2 * | 6/2011 | Nojima | 348/231.99 |
| 7,992,181 B2 * | 8/2011 | Furuhashi et al. | 725/105 |

(Continued)

FOREIGN PATENT DOCUMENTS

| | | |
|---|---|---|
| JP | 2003-018453 A | 1/2003 |
| JP | 2003087815 A | 3/2003 |

(Continued)

*Primary Examiner* — Ngoc-Yen Vu
(74) *Attorney, Agent, or Firm* — Canon U.S.A., Inc. IP Division

(57) ABSTRACT

The present invention is directed to providing an imaging apparatus that can determine an imaging scene of an input image with high accuracy. The imaging apparatus includes an imaging unit configured to image an object image and output image data, a determination unit configured to, based on the image data, perform determination processing for determining an imaging scene of the image data output from the imaging unit, an acquisition unit configured to acquire imaging information related to a condition for imaging the image data including location information about the imaging apparatus, and a communication unit configured to transmit the imaging information to an external device and receives auxiliary information for supporting determination of the imaging scene of the image data corresponding to the imaging information. The determination unit performs the determination processing based on the auxiliary information received via the communication unit.

16 Claims, 11 Drawing Sheets

(56) References Cited

U.S. PATENT DOCUMENTS

| | | | |
|---|---|---|---|
| 8,094,963 B2 * | 1/2012 | Funayama | 382/274 |
| 8,194,986 B2 * | 6/2012 | Conwell | 382/224 |
| 8,248,484 B2 * | 8/2012 | Sugimoto | 348/222.1 |
| 8,264,585 B2 * | 9/2012 | Shintani | 348/333.05 |
| 8,294,813 B2 * | 10/2012 | Kawaguchi et al. | 348/371 |
| 8,743,236 B2 * | 6/2014 | Hata | H04N 9/045 348/222.1 |
| 2005/0102376 A1 * | 5/2005 | Ichikawa | 709/219 |
| 2009/0175551 A1 * | 7/2009 | Thorn | 382/254 |

FOREIGN PATENT DOCUMENTS

| | | |
|---|---|---|
| JP | 2003244709 A | 8/2003 |
| JP | 2004-054201 A | 2/2004 |
| JP | 2005167929 A | 6/2005 |
| JP | 2005328271 A | 11/2005 |
| JP | 2008-228086 A | 9/2008 |
| JP | 2009-077157 A | 4/2009 |
| WO | 2006/028109 A1 | 3/2006 |
| WO | 2006028108 A1 | 3/2006 |

* cited by examiner

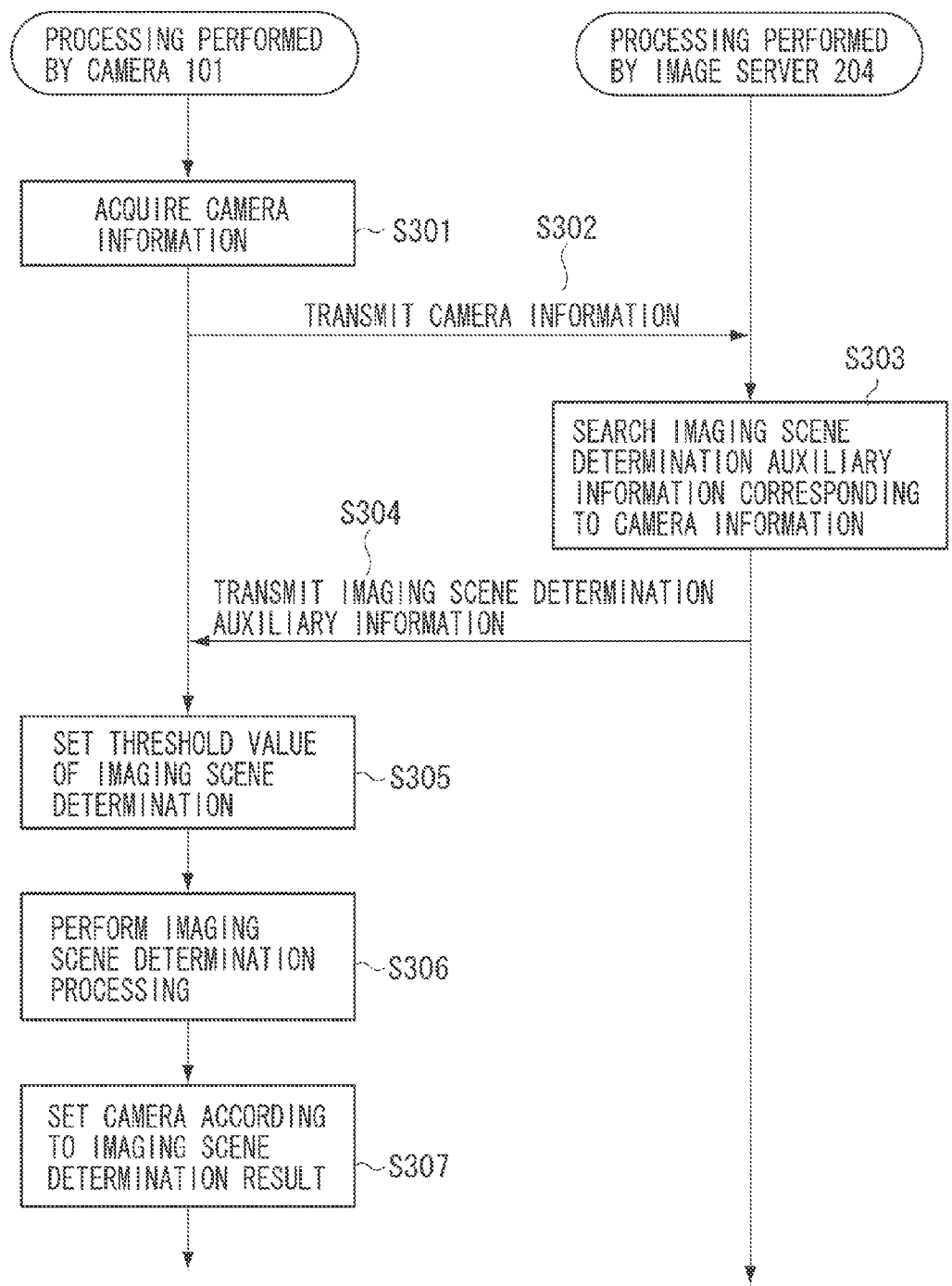

FIG. 4

| IMAGE ID | REFERENCE IMAGE FILE | IMAGING LOCATION | IMAGING DATE AND TIME | IMAGING SCENE |
|---|---|---|---|---|
| 0001 | IMG_AAA.jpg | LATITUDE 35 DEGREES 39 MINUTES XX SECONDS<br>LONGITUDE 139 DEGREES 44 MINUTES XX SECONDS | 2006/10/21<br>14:49:22 | AUTO |
| 0002 | IMG_BBB.jpg | LATITUDE 35 DEGREES 39 MINUTES XX SECONDS<br>LONGITUDE 139 DEGREES 44 MINUTES XX SECONDS | 2009/08/01<br>17:30:21 | SUNSET |
| 0003 | IMG_CCC.jpg | LATITUDE 35 DEGREES 39 MINUTES XX SECONDS<br>LONGITUDE 139 DEGREES 44 MINUTES XX SECONDS | 2008/09/10<br>16:40:33 | SUNSET |
| 0004 | IMG_DDD.jpg | LATITUDE 35 DEGREES 39 MINUTES XX SECONDS<br>LONGITUDE 139 DEGREES 44 MINUTES XX SECONDS | 2009/04/05<br>16:55:10 | SUNSET |
| 0005 | IMG_EEE.jpg | LATITUDE 35 DEGREES 39 MINUTES XX SECONDS<br>LONGITUDE 139 DEGREES 44 MINUTES XX SECONDS | 2010/01/13<br>18:30:30 | PORTRAIT |
| 0006 | IMG_FFF.jpg | LATITUDE 35 DEGREES 39 MINUTES XX SECONDS<br>LONGITUDE 139 DEGREES 44 MINUTES XX SECONDS | 2010/11/21<br>16:40:50 | SUNSET |

FIG. 9A

| IMAGE ID | REFERENCE IMAGE FILE | IMAGING LOCATION | IMAGING DATE AND TIME | EXPOSURE TIME | APERTURE VALUE | FOCUSING POSITION | WHITE BALANCE |
|---|---|---|---|---|---|---|---|
| 0001 | IMG_AAA.jpg | LATITUDE 35 DEGREES 39 MINUTES XX SECONDS LONGITUDE 139 DEGREES 44 MINUTES XX SECONDS | 2006/10/21 14:49:22 | 1/20 | 8 | NEAR | AUTO |
| 0002 | IMG_BBB.jpg | LATITUDE 35 DEGREES 39 MINUTES XX SECONDS LONGITUDE 139 DEGREES 44 MINUTES XX SECONDS | 2009/08/01 17:30:21 | 1/500 | 8 | FAR | SUNLIGHT |
| 0003 | IMG_CCC.jpg | LATITUDE 35 DEGREES 39 MINUTES XX SECONDS LONGITUDE 139 DEGREES 44 MINUTES XX SECONDS | 2008/09/10 16:40:33 | 1/250 | 7.1 | FAR | SUNLIGHT |
| 0004 | IMG_DDD.jpg | LATITUDE 35 DEGREES 39 MINUTES XX SECONDS LONGITUDE 139 DEGREES 44 MINUTES XX SECONDS | 2009/04/05 16:55:10 | 1/500 | 7.1 | FAR | SUNLIGHT |
| 0005 | IMG_EEE.jpg | LATITUDE 35 DEGREES 39 MINUTES XX SECONDS LONGITUDE 139 DEGREES 44 MINUTES XX SECONDS | 2010/01/13 18:30:30 | 1/750 | 4 | NEAR | SHADE |
| 0006 | IMG_FFF.jpg | LATITUDE 35 DEGREES 39 MINUTES XX SECONDS LONGITUDE 139 DEGREES 44 MINUTES XX SECONDS | 2010/11/21 16:40:50 | 1/250 | 10 | FAR | SHADE |

FIG. 9B

| EXPOSURE TIME | APERTURE VALUE | FOCUSING POSITION | WHITE BALANCE |
|---|---|---|---|
| 1/250 ~ 1/500 | 7.1 ~ 8.0 | FAR | SUNLIGHT |

FIG. 9C

| SHOOTING SCENE | EXPOSURE TIME | APERTURE VALUE | FOCUSING POSITION | WHITE BALANCE |
|---|---|---|---|---|
| SUNSET | 1/250 | 7.1 | FAR | SUNLIGHT |
| BLUE SKY | 1/500 | 5.6 | FAR | SUNLIGHT |
| NIGHT VIEW | 1/40 | 3.5 | FAR | SUNLIGHT |
| PORTRAIT | 1/250 | 5.6 | NEAR | AUTO |
| LANDSCAPE | 1/500 | 5.6 | FAR | AUTO |

IMAGING APPARATUS, IMAGING SYSTEM, AND CONTROL METHOD FOR INCREASING ACCURACY WHEN DETERMINING AN IMAGING SCENE BASED ON INPUT IMAGE DATA AND INFORMATION STORED IN AN EXTERNAL INFORMATION PROCESSING APPARATUS

BACKGROUND OF THE INVENTION

1. Field of the Invention

The present invention relates to an imaging apparatus that performs scene determination of a scene to be captured based on input image data and information stored in an external information processing apparatus.

2. Description of the Related Art

There has been a conventional imaging apparatus that determines, based on a feature of input image data, an imaging scene of an image (type of an object) and performs image processing according to the determined imaging scene. For example, Japanese Patent Application Laid-Open No. 2003-018453 discusses a technique in which a camera that can automatically determine the current imaging scene from among a plurality of candidates including a landscape, a sunset, and a night view, performs image processing including different contents depending on whether the imaging scene is set automatically or manually by a user.

On the other hand, a technique of an imaging apparatus is known that can set parameters for capturing an image using information stored in the external information processing apparatus. For example, Japanese Patent Application Laid-Open No. 2009-077157 discusses a technique of a camera for searching for a reference image similar to a preview image of the image to be captured, acquiring and setting camera setting parameters when imaging the reference image.

However, the conventional technique for determining an imaging scene according to the feature of the image data may erroneously determine the imaging scene. For example, a room illuminated with illumination having a low color temperature may be erroneously determined as a sunset sky having similar colors.

Further, according to the conventional technique for determining the imaging scene based on the reference image stored in the external information processing apparatus, when there is no reference image that is similar to an image that the user is going to capture, it is difficult to determine the imaging scene with high accuracy.

SUMMARY OF THE INVENTION

The present invention is directed to an imaging apparatus that can determine an imaging scene of an input image with high accuracy.

According to an aspect of the present invention, an imaging apparatus includes: an imaging unit configured to image an object image and output image data; a determination unit configured to, based on the image data, perform determination processing for determining a imaging scene of the image data output from the imaging unit; an acquisition unit configured to acquire imaging information related to a condition for imaging the image data including location information about the imaging apparatus; and a communication unit configured to transmit the imaging information to an external device and receive auxiliary information for supporting determination of the imaging scene of the image data corresponding to the imaging information. The determination unit performs the determination processing based on the auxiliary information received via the communication unit.

Further features and aspects of the present invention will become apparent from the following detailed descriptions of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the descriptions, serve to explain the principles of the invention.

FIG. 3 is a sequence diagram illustrating a processing operation of the imaging system according to the first exemplary embodiment of the present invention.

FIG. 4 illustrates image data briefly according to the first exemplary embodiment of the present invention.

FIGS. 9A, 9B, and 9C are sequence diagrams illustrating processing operations of an imaging system according to a third exemplary embodiment of the present invention.

DESCRIPTION OF THE EMBODIMENTS

Various exemplary embodiments, features, and aspects of the invention will be described in detail below with reference to the drawings.

In an exemplary embodiment of the present invention, an example imaging system using a digital camera including an imaging apparatus is described. Herein, imaging scenes includes five types of imaging scenes such as a "portrait" for imaging a scene including a person, a "sunset sky" for imaging a scene including a sunset sky, a "blue sky" for imaging a scene including a blue sky, a "night view" for imaging a night view, and a "landscape" for imaging a landscape. The exemplary embodiment determines the imaging scene out of the 5 types of scenes. However, the scenes to be determined using the present invention are not limited to the above-described scenes.

With reference to FIGS. 1 to 7, an imaging apparatus according to a first exemplary embodiment of the present invention will be described.

Figure 2:
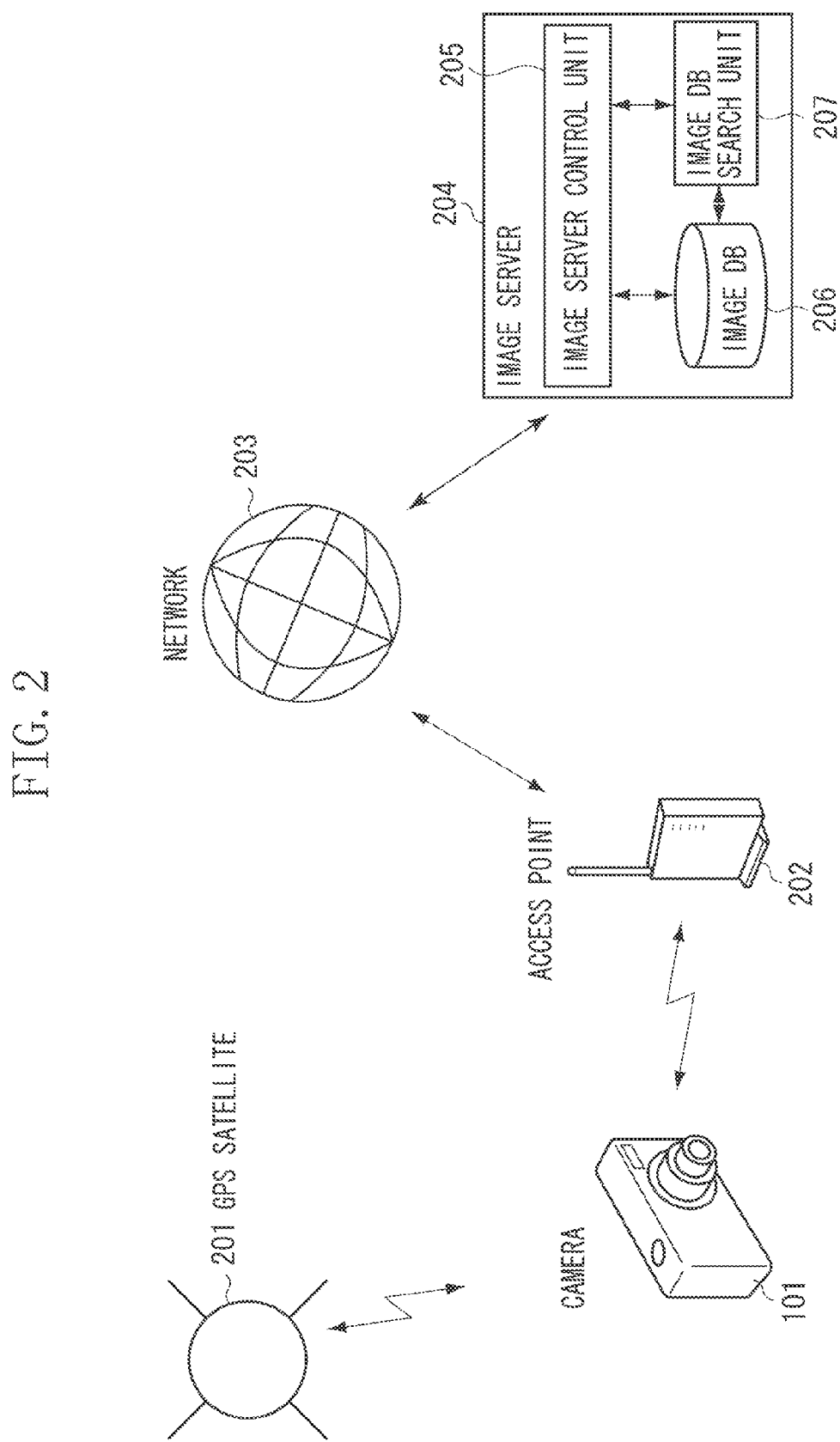
FIG. 2 illustrates a configuration of an imaging system according to the first exemplary embodiment of the present invention.

FIG. 2 illustrates a configuration of an imaging system briefly according to a first exemplary embodiment. In FIG. 2, a global positioning system (GPS) satellite 201 outputs a GPS signal for performing positioning. A camera 101 captures images. Further, the camera 101 communicates with an image server 204 (information processing apparatus) via an access point 202 and a network 203.

The image server 204 includes an image server control unit 205, an image data base (DB) 206, and an image DB search unit 207. The image server control unit 205 controls processing of each unit included in the image server 204. The image DB 206 includes a storage device that stores an image file and imaging scene determination auxiliary information described below. The image DB search unit 207 searches data stored in the image DB 206 with a specified condition.

Figure 1:
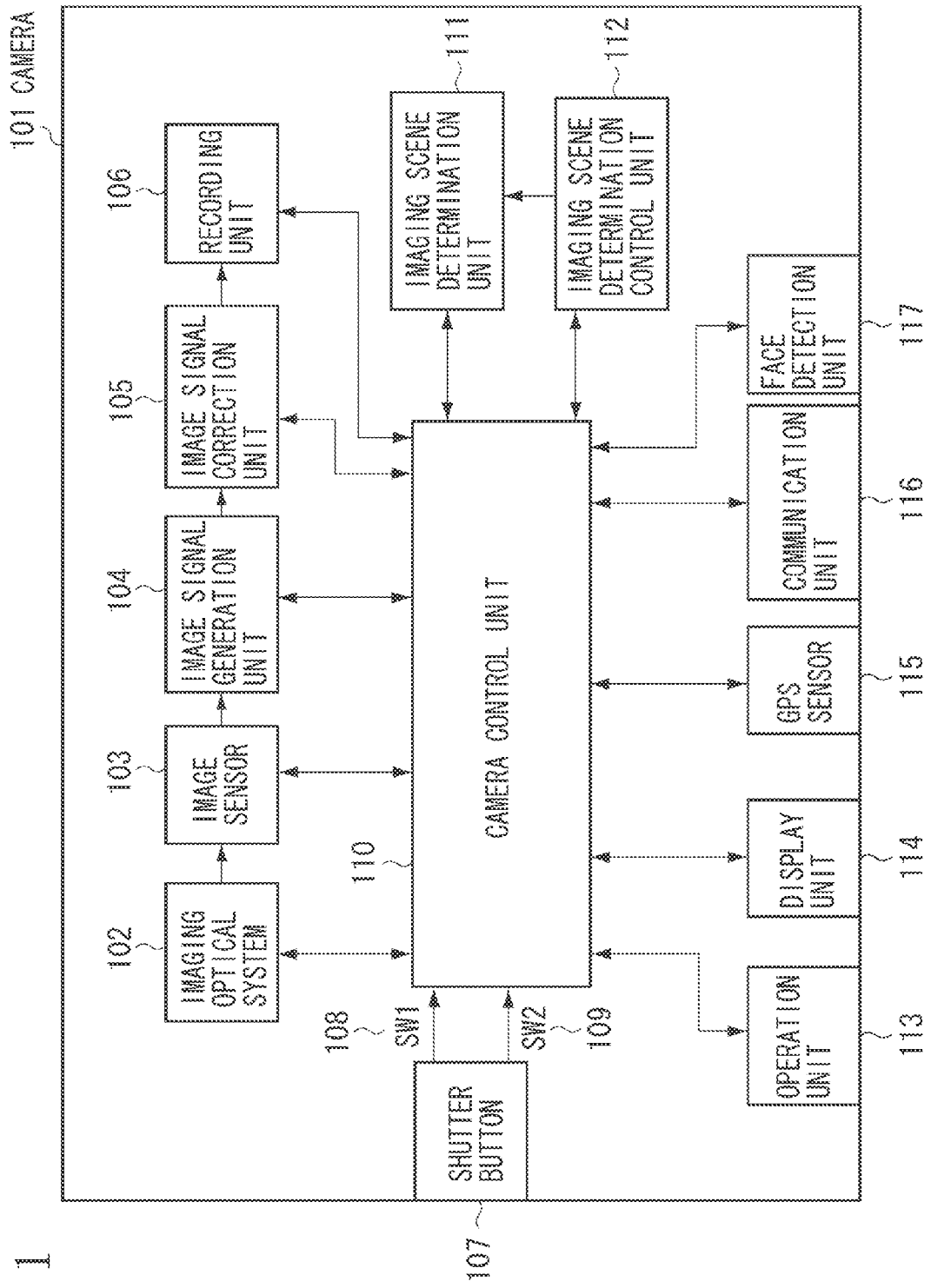
FIG. 1 is a block diagram illustrating a configuration of an imaging apparatus according to a first exemplary embodiment of the present invention.

Next, with reference to FIG. 1, a configuration and an operation of the camera 101 will be described. FIG. 1 is a block diagram illustrating a main component configuration of the camera 101. In FIG. 1, an imaging optical system 102 forms an image from a light flux from an object and includes a lens and a diaphragm (not illustrated). An image sensor 103 photo-electrically converts the incident light flux and outputs it as an electric signal. An image signal generation unit 104 converts the electric signal generated by the image sensor 103 into an image signal.

The image signal includes a luminance signal (yellow (Y)) and color signals (red (R), green (G), blue (B)). An image signal correction unit 105 receives the imaging scene determination result described below and performs correction processing including white balance correction, gummer processing, hue and color saturation correction, and edge emphasis corresponding to the imaging scene determined to the image signal. A recording unit 106 records the image data.

A shutter button 107 is used by a user to control an imaging operation. A shutter switch (SW1) 108 is turned on when the shutter button 107 is half pressed to issue an instruction to start operations of auto focus [AF) processing and auto exposure (AE) processing. A shutter switch (SW2) 109 is turned on when the shutter button 107 is fully pressed to issue an instruction to start a series of imaging operations from reading the image signal to recording the image.

A camera control unit 110 controls an operation of each component of the camera 101. An imaging scene determination unit 111 determines an imaging scene based on the image signal. An imaging scene determination control unit 112 controls imaging scene determination performed by the imaging scene determination unit 111. An operation unit 113 receives an operation by the user.

A display unit 114 displays a preview image to the user. A GPS sensor 115 receives the GPS signal from the GPS satellite. A communication unit 116 communicates with the image server 204 via the access point 202 and the network 203. A face detection unit 117 detects a face of a person in the image based on the image signal.

Next, a processing operation performed by the imaging apparatus illustrated in FIG. 1 will be described. An object image that has passed through the imaging optical system 102 is formed on the image sensor 103. The image sensor 103 converts the incident light flux into the electric signal, and then outputs the electric signal to the image signal generation unit 104. The image signal generation unit 104 generates the luminance signal (Y) and the color signals (R, G, B) and outputs them to the image signal correction unit 105 and the imaging scene determination unit 111.

The imaging scene determination unit 111 determines the imaging scene based on the input image signal, and outputs the determined result to the image signal correction unit 105 via the camera control unit 110. Details of the imaging scene determination processing performed by the imaging scene determination unit 111 will be described below.

The image signal correction unit 105, based on the imaging scene determination result acquired by the imaging scene determination unit 111, performs correction on the input image signal, and outputs the corrected image signal to the display unit 114 and the recording unit 106. The display unit 114 displays the input image signal to the user as a preview image.

The user checks the preview image, and then operates the shutter button 107 to turn on the SW1 108. When the SW1 108 is turned on, the camera control unit 110 controls each unit of the camera 101 to start the AF processing and the AE processing.

Next, when the user turns on the SW2 109, the camera control unit 110 controls each unit of the camera 101 to perform a series of the processing from reading the image signal from the image sensor 103 to recording the image signal into the recording unit 106.

Next, referring to the flowchart illustrated in FIG. 3, an operation of the imaging system related to the imaging scene determination processing, which is a characteristic portion according to the present exemplary embodiment, will be described. A series of the processing performed by the camera 101 described below is executed while the image is previewed according to the control performed by the camera control unit 110.

In step S301, the camera control unit 110 acquires camera information (imaging information) that indicates a state (imaging condition) of the camera. According to the present exemplary embodiment, the camera information includes location information indicating an imaging location and time information indicating an imaging time and a time zone.

In order to acquire the camera information, the camera control unit 110 transmits a request for acquiring the location information and the time information to the GPS sensor 115. Upon receiving the acquisition request, the GPS sensor 115 receives the GPS signal from the GPS satellite 201, calculates the information about the current date, time, and position, and then outputs the information to the camera control unit 110.

In step S302, the camera control unit 110 transmits the location information and the time information as the camera information to the image server 204 via the communication unit 116, and, in addition, requests the imaging scene determination auxiliary information corresponding to the camera information.

In step S303, the image DB search unit 207 of the image server 204 searches for the imaging scene determination auxiliary information corresponding to the received camera information. Herein, the imaging scene determination auxiliary information is generated based on the information stored in the image DB 206 and used for determining the imaging scene described below.

According to the present exemplary embodiment, from among the image data stored in the image DB 206, the image data having the camera information matching with the camera information about the camera 101 or similar camera information within a predetermined error range, is searched. Evaluation information acquired by performing evaluation on the imaging scene of the captured image data is used as the imaging scene determination auxiliary information.

More specifically, the imaging scene having a high imaging frequency (first imaging scene) is regarded to have a higher evaluation than the imaging scene having a lower imaging frequency (second imaging scene), and the imaging scene information having the highest imaging frequency is used as the imaging scene determination auxiliary information. With reference to FIG. 4, searching for the imaging scene determination auxiliary information will be more specifically described.

FIG. 4 illustrates the image data stored in the image DB 206 briefly. As illustrated in FIG. 4, corresponding camera information and data of the imaging scene are associated with each reference image file, and recorded.

Herein, the data of the imaging scene of the reference image file is acquired by recording the imaging mode information which a user of the reference image sets for the camera when imaging the reference image or the scene information determined by the camera. For example, if the sunset sky mode is set when imaging the reference image, the imaging scene is determined as the sunset sky and is recorded.

The data stored in the image DB 206 may be used as long as the data can be associated with the camera information, and does not necessarily need the image data. However, if the image data is stored, which can be a sample of the image captured under an imaging condition where the imaging is to be performed currently, the user can set the camera by himself with reference to the image data as a sample.

Upon receiving the camera information and a search request of the imaging scene determination auxiliary information from the camera 101, the image DB search unit 207 searches the image DB 206 for the image data captured under a condition specified by the camera information transmitted from the camera 101 or a similar condition thereto.

More specifically, the image data that includes the location information and the time information corresponding to or close to those transmitted from the camera 101, is searched and extracted. The image DB search unit 207 outputs the extracted image data to the image server control unit 205.

The image server control unit 205, based on the extracted image data, determines the imaging scene determination auxiliary information to be transmitted to the camera 101. More specifically, the image server control unit 205 determines the imaging scene having the highest imaging frequency in the extracted image data, and then transmits the information about the determined imaging scene to the camera 101.

For example, when the camera information, which indicates that the imaging is performed at a imaging location of the latitude 35 degrees 39 minutes and the longitude 139 degrees 44 minutes at a time of 15:00, is transmitted from the camera 101, a plurality of pieces of image data as illustrated in FIG. 4 are extracted by the image DB search unit 207.

The six pieces of extracted data includes four pieces of the image data captured as the sunset sky scene, which has the highest imaging frequency. In this case, the image server control unit 205 determines as the imaging scene determination auxiliary information the information indicating that the imaging scene having the highest imaging frequency is the sunset sky scene.

In step S304, the image server control unit 205 transmits to the camera 101 the determined imaging scene determination auxiliary information.

In step S305, based on the imaging scene determination auxiliary information received from the image server 204 via the communication unit 116, the imaging scene determination control unit 112 calculates the imaging scene determination threshold value used for the imaging scene determination processing, and outputs the imaging scene determination threshold value to the imaging scene determination unit 111. A method for calculating the imaging scene determination threshold herein will be described in detail.

In step S306, based on the imaging scene determination threshold value received from the imaging scene determination control unit 112 and the image signal received from the image signal generation unit 104, the imaging scene determination unit 111 performs the determination processing on the imaging scene. The content of the imaging scene determination processing will be described below in detail. The imaging scene determination unit 111 transmits the imaging scene determination result to the camera control unit 110.

In step S307, based on the received imaging scene determination result, the camera control unit 110 controls the operation of each unit of the camera 101 so that an optimum quality can be acquired for the imaging scene.

For example, if the imaging scene determination result is the sunset sky, the camera control unit 110 controls the image signal correction unit 105 to apply gain to red component of the image signal, controls the imaging optical system 102 to set exposure relatively lower, and then controls each unit of the camera 101 to be appropriate for imaging the sunset sky.

Similarly, if the imaging scene determination result is the blue sky, the camera control unit 110 controls each unit of the camera 101 to apply gain to blue component of the image signal in order to highlight the color of the blue sky. If the imaging scene determination result is the portrait, the camera control unit 110 controls each unit of the camera 101 to set the exposure to be appropriate for a face of a person in order to appropriately capture the face thereof.

If the imaging scene determination result is the night view, the camera control unit 110 controls each unit of the camera 101 to set a focus position in the distance or in the infinite distance and sets an exposure time longer in order to appropriately capture the night view. If the imaging scene determination result is the landscape, the camera control unit 110 controls each unit of the camera 101 to apply gain to the image signal in color saturation in order to appropriately capture an image of the landscape. The outline of the processing operation of the imaging system related to the imaging scene determination processing has been described above.

Figure 7:
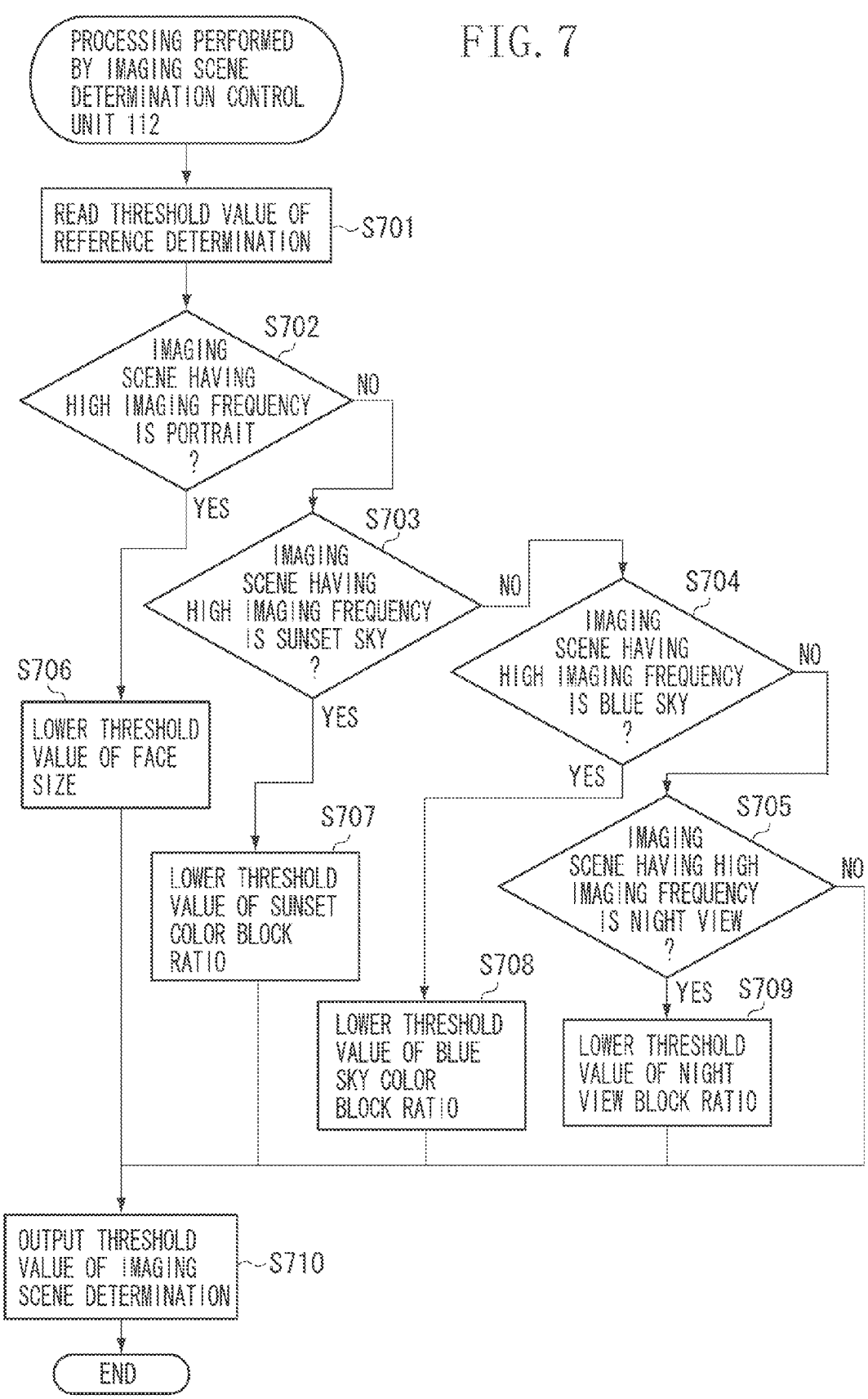
FIG. 7 is a flowchart illustrating a flow of control of imaging scene determination processing according to the first exemplary embodiment of the present invention.

Next, with reference to FIG. 5, the content of the imaging scene determination processing in step S306 will be described, and then, with reference to FIG. 7, a method for calculating the imaging scene determination threshold value in step S305 will be described. In order to determine whether the captured image satisfies a condition of each scene, an image feature amount according to the scene is calculated from the image data, and scene determination is performed by comparing the image feature amount with the determination threshold value.

Figure 5:
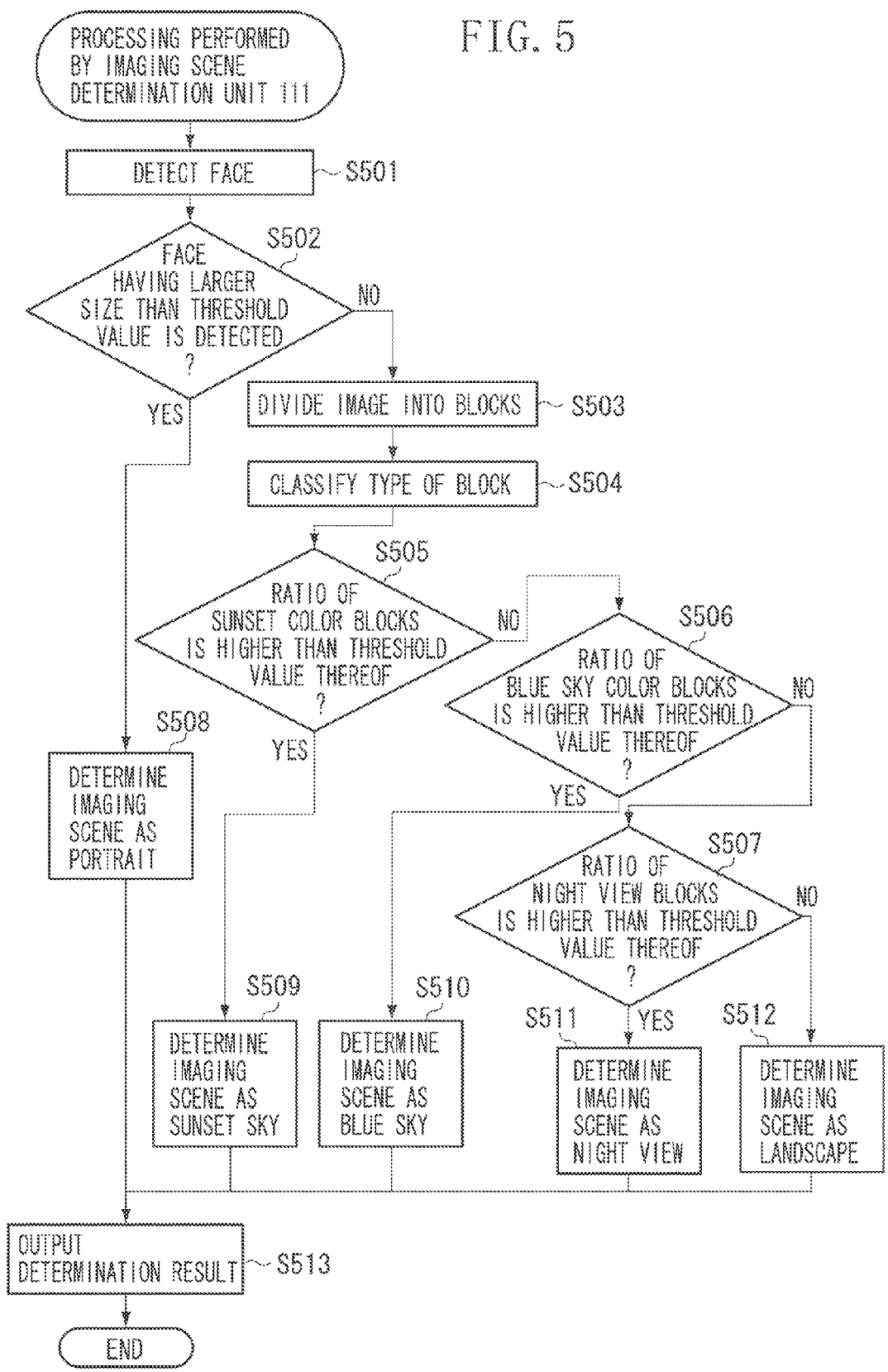
FIG. 5 is a flowchart illustrating a flow of imaging scene determination processing according to the first exemplary embodiment of the present invention.

FIG. 5 is a flowchart illustrating a flow of the imaging scene determination processing performed by the imaging scene determination unit 111.

In step S501, the imaging scene determination unit 111 requests the face detection unit 117 to perform face detection processing. The face detection unit 117 detects a face of a person in the image in response to the detection request.

More specifically, the face detection unit 117 previously prepares various types of faces as a template, and performs pattern matching between the input image data and the template to detect a face of a person. The face detection unit 117 outputs to the imaging scene determination unit 111 the information about whether a face of a person is detected in the image, and when detected, the information about a position and a size of the face.

In step S502, the imaging scene determination unit 111 determines whether the face detection unit 117 detects the face and whether the size of the detected face is larger than a predetermined threshold value of the face size. When the condition is satisfied (YES in step S502), the processing proceeds to step S508, and when the condition is not satisfied (NO in step S502), the processing proceeds to step S503.

In step S503, the imaging scene determination unit 111 divides the image into blocks (e.g., 8×8 blocks) and calculates an average value of a color difference signal (R−Y, B−Y) for each block.

Next, in step S504, the imaging scene determination unit 111 classifies each image block into four types of blocks including the sunset color, the blue sky color, the night view, and others based on the image signal of the image block. A method for classifying the blocks will be described below.

Figure 6:
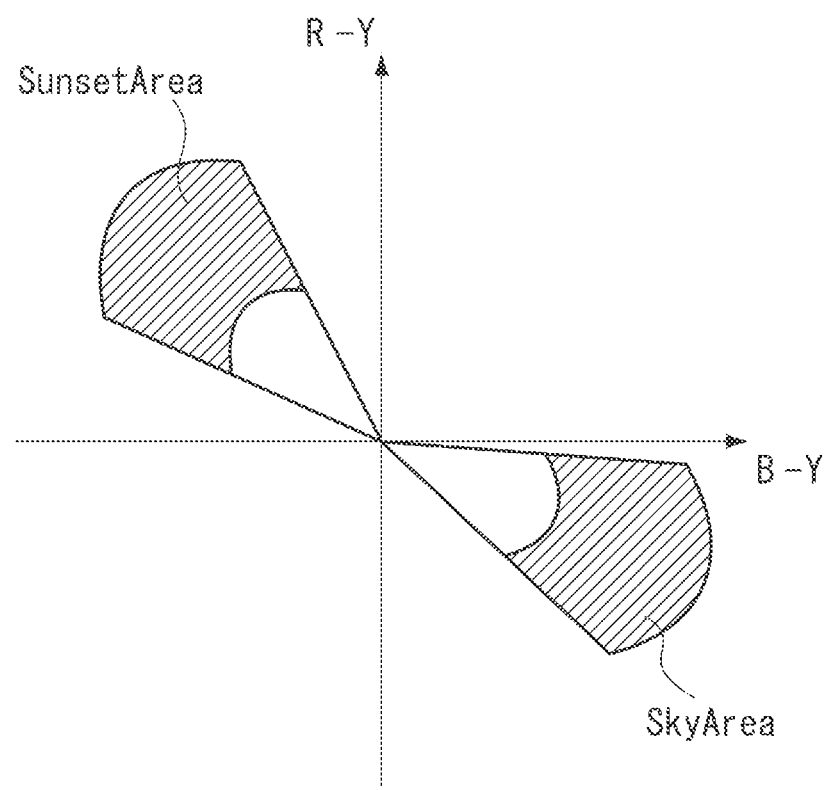
FIG. 6 illustrates imaging scene determination processing according to the first exemplary embodiment of the present invention.

A sunset color block and a blue sky color block are determined by whether values of the luminance signal and the color difference signal are within a predetermined range. FIG. 6 illustrates a definition area of the sunset color block (SunsetArea) and that of a blue sky color block (SkyArea) on a color difference plain. For example, of image blocks, a block that has the luminance signal equal to or more than a predetermined luminance threshold value and includes the color difference signal included in the SunsetArea (SkyArea) illustrated in FIG. 6 is classified into the SunsetArea (SkyArea) block.

Further, the night view block is determined based on the luminance signal of each pixel. More specifically, of blocks, the block that has an average luminance equal to or less than the predetermined luminance threshold value, and includes the number equal to or more than a predetermined threshold value of the pixels having the high luminance is classified as the night view block. The block that does not satisfy any conditions described above is classified into the other block.

The imaging scene determination unit 111 classifies each block as described above, and then calculates a ratio of blocks for each type. More specifically, of all blocks, the ratio of the blocks classified into the sunset color block is calculated as the ratio of the sunset color blocks. Similarly, the imaging scene determination unit 111 calculates a ratio of the blue sky color blocks and that of the night view blocks.

Next, based on the calculated ratio of the blocks, the imaging scene determination unit 111 determines the imaging scene. First, in step S505, the imaging scene determination unit 111 compares the ratio of the sunset color blocks with a predetermined threshold value of the ratio thereof. When the ratio of the sunset color blocks is higher than the threshold value of the ratio thereof (YES in step S505), the processing proceeds to step S509. When the ratio of the sunset color blocks is equal to or lower than the threshold value of the ratio thereof (NO in step S505), the processing proceeds to step S506.

In step S506, the imaging scene determination unit 111 compares the ratio of the blue sky color blocks with a predetermined threshold value of the ratio thereof. When the ratio of the blue sky color blocks is higher than the threshold value of the ratio thereof (YES in step S506), the processing proceeds to step S510. When the ratio of the blue sky color blocks is equal to or lower than the threshold value of the ratio thereof [NO in step S506), the processing proceeds to step S507.

In step S507, the imaging scene determination unit 111 compares the ratio of the night view blocks with a predetermined threshold value of the ratio thereof. When the ratio of the night view blocks is higher than a predetermined threshold value of the ratio thereof (YES in step S507), the processing proceeds to step S511. When the ratio of the night view blocks is equal to or lower than a predetermined threshold value of the ratio thereof (NO in step S507), the processing proceeds to step S512.

In step S508, the imaging scene determination unit 111 determines the current imaging scene as the portrait. In S509, the imaging scene determination unit 111 determines the current imaging scene as the sunset sky. In step S510, the imaging scene determination unit 111 determines the current imaging scene as the blue sky.

In step S511, the imaging scene determination unit 111 determines the current imaging scene as the night view. In step S512, the imaging scene determination unit 111 determines the current imaging scene as the landscape. In step S513, the imaging scene determination unit 111 outputs the determination result of the imaging scene to the camera control unit 110. The details described above are the imaging scene determination processing performed in step S306 illustrated in FIG. 3.

Next, a method for calculating the imaging scene determination threshold value performed by the imaging scene determination control unit 112 in step S305 illustrated in FIG. 3 will be described. Based on the imaging scene determination auxiliary information received from the image server 204, the imaging scene determination control unit 112 calculates the threshold value to be used to determine the imaging scene, and then outputs the threshold value to the imaging scene determination unit 111.

According to the present exemplary embodiment, for the imaging scene having the high imaging frequency received as the imaging scene determination auxiliary information, the corresponding imaging scene determination threshold value is set to a lower value than usual.

With reference to a flowchart illustrated in FIG. 7, a flow of processing performed by the imaging scene determination control unit 112 will be described.

In step S701, the imaging scene determination control unit 112 reads from a memory (not illustrated) a reference value of a previously set determination threshold value for each imaging scene.

In step S702, the imaging scene determination control unit 112 determines whether the imaging scene of the imaging scene determination auxiliary information received from the image server 204 is the portrait. When it is the portrait (YES in step S702), the processing proceeds to step S706. When it is not the portrait (NO in step S702), the processing proceeds to step S703.

In step S703, the imaging scene determination control unit 112 determines whether the imaging scene of the imaging scene determination auxiliary information is the sunset sky. When it is the sunset sky (YES in step S703), the processing proceeds to step S707. When it is not the sunset sky (NO in step S703), the processing proceeds to step S704.

In step S704, the imaging scene determination control unit 112 determines whether the imaging scene of the imaging scene determination auxiliary information is the blue sky. When it is the blue sky (YES in step S704), the processing proceeds to step S708. When it is not the blue sky (NO in step S704), the processing proceeds to step S705.

In step S705, the imaging scene determination control unit 112 determines whether the imaging scene of the imaging scene determination auxiliary information is the night view. When it is the night view (YES in step S705), the processing proceeds to step S709. When it is not the night view (NO in step S705), the processing proceeds to step S710.

In step S706, the imaging scene determination control unit 112 determines the threshold value of the face size to be a value that is a predetermined amount lower than the reference value read in step S701. In step S707, the imaging scene determination control unit 112 determines the threshold value of the ratio of the sunset color blocks to be a value that is a predetermined amount lower than the reference value read in step S701. In step S708, the imaging scene determination control unit 112 determines the threshold value of the ratio of the blue sky color blocks to be a value that is a predetermined amount lower than the reference value read in step S701.

In step S709, the imaging scene determination control unit 112 determines the threshold value of the ratio of the night view blocks to be a value that is a predetermined amount lower than the reference value read in step S701. In step S710, the imaging scene determination control unit 112 outputs to the imaging scene determination unit 111 the determined imaging scene determination threshold value for each imaging scene.

Accordingly, the value the predetermined amount lower than the reference value is output to the imaging scene determination unit 111 as the imaging scene determination threshold value corresponding to the imaging scene of the imaging scene determination auxiliary information. The reference value is output to the imaging scene determination unit 111 as other imaging scene determination threshold value than that described above.

As described above, according to the present exemplary embodiment, the imaging apparatus that determines the imaging scene based on the image signal acquires the auxiliary information to be used for the imaging scene determination from the external database, and then, based on the auxiliary information, controls the imaging scene determination processing.

More specifically, in a state where the imaging location and the imaging time zone of the imaging scene are matched or close to those of the auxiliary information, the imaging scene determination threshold value for the imaging scene having the high imaging frequency is set to a low value. With this arrangement, the imaging scene having the high imaging frequency, which is the imaging scene having a high evaluation, is easily selected as the imaging scene determination result, thereby improving accuracy for determining the imaging scene.

Further, a method for using the imaging scene of the reference image in the external database as the current imaging scene as it is, cannot appropriately determine the imaging scene when the reference image corresponding to the input image is not available.

On the other hand, according to the method of the present exemplary embodiment, while using the information acquired from an external device in an auxiliary manner, the feature of the input image signal is analyzed to determine the imaging scene. With this arrangement, even when the reference image corresponding to the input image is not available, the imaging scene can be appropriately determined.

According to the exemplary embodiment described above, the imaging scene is explained to be classified into five types including the portrait, the sunset sky, the blue sky, the night view, and the landscape, however, the contents of the imaging scene of the present invention are not limited thereto. In other words, based on the feature of the image signal, as long as a type of imaging scene or the object is determined, any determination may be performed on the imaging scene.

For example, using an area of a region where the image signal has high saturation as a feature amount, whether the imaging scene has the high saturation may be determined. In this case, similarly to the above-described exemplary embodiment, when the imaging scene having the high imaging frequency has the high saturation, the determination threshold value for the scene having the high saturation is set low. As described above, for the various imaging scenes, the scene determination can be performed according to a user's sense or intention.

Further, according to the above-described exemplary embodiment, the method is described for determining the imaging scene according to the imaging scene based on whether the face of the person is included, the result of dividing the image into blocks, and classifying the blocks, however, the method for determining the imaging scene of the present invention is not limited thereto. In other words, based on the feature of the image signal, as long as the method determines the imaging scene, any method may be used.

For example, when determining the sunset sky, distribution of the image signals is determined by the pixel unit, and then a ratio may be calculated at which a region of the sunset sky color accounts for the whole image. In this case, the threshold value of the ratio of the region having the sunset sky color may be controlled based on the imaging scene determination auxiliary information. By adding a determination condition as described above, the accuracy for determining the imaging scene can be improved.

Further, according to the above-described exemplary embodiment, the time information and the location information is used as the camera information, however the content of the camera information of the present invention is not limited thereto. In other words, as long as the information indicates the state of the camera (imaging condition) when imaging, any information may be used.

For example, the camera information may include camera type information, date information indicating a date of imaging, direction information indicating an imaging direction, a field of view information indicating an imaging region, a season information indicating an imaging season, and climate information indicating a climate of the imaging location. With this information, the accuracy for extracting the imaging scene determination auxiliary information can be improved.

Further, according to the above-described exemplary embodiment, the imaging scene determination processing and the setting of the imaging scene determination threshold value are repeatedly performed during the image preview, however, timings of the imaging scene determination processing and the setting of the imaging scene determination threshold value of the present invention are not limited thereto.

For example, at a timing when it is detected that the user operates the shutter button 107 to turn on the SW1 108, the imaging scene determination processing and the setting of the imaging scene determination threshold value may be started. With this arrangement, processing workload of the imaging apparatus related to the imaging scene determination processing can be decreased.

Further, as the camera information, together with the location information, the imaging apparatus may transmit to the server the preview image (through image) as it is or an encrypted preview image, or the feature amount of the preview image.

The preview image is transmitted as it is so that, based on similarity between the images and that of the analysis results thereof, the reference images can be narrowed down at a server side, thereby increasing the accuracy of the determination auxiliary information.

Considering a problem of privacy protection caused by transmitting the preview image as it is, the imaging apparatus may transmit to the server the preview image on which some encryption is performed or the preview image converted just enough to acquire the necessary feature amount.

Further, according to the above-described exemplary embodiment, the imaging scene having the highest imaging frequency is used as the imaging scene determination auxiliary information, however, the content of the imaging scene determination auxiliary information of the present invention is not limited thereto.

For example, three types of imaging scenes may be extracted in order from the imaging scene having the highest imaging frequency so that their information can be used as the imaging scene information. In this case, the imaging scene determination threshold values for the three types of the extracted imaging scenes may be set to the values lower than usual.

Further, according to the above-described exemplary embodiment, the imaging frequency is used as the evaluation value for the imaging scene, however, the method for evaluating the imaging scene of the present invention is not limited thereto. For example, after capturing the image, the user may determine whether the result of determining the imaging scene is appropriate, and record the result on the image server.

In this case, the imaging scene having the largest number of determinations in which the user determines the result to be appropriate is considered as the imaging scene having the highest evaluation, and used as the imaging scene determination auxiliary information. With this information, the user's intention and sense can be more appropriately reflected to control the imaging scene determination.

Further, according to the above-described exemplary embodiment, the processing for determining the imaging scene having the highest imaging frequency is performed on the image server, however, the method for generating the imaging scene determination auxiliary information of the present invention is not limited thereto.

For example, the processing may be performed on the image server until the image data corresponding to the camera information is searched, the extracted image data may be transmitted to the camera 101, and then the camera control unit 110 of the camera 101 may determine the imaging scene having the high imaging frequency. With this arrangement, the workload for the processing performed by the image server can be decreased.

Further, according to the above-described exemplary embodiment, correction processing on the image signal is controlled according to the imaging scene determination result, however, the method for outputting the imaging scene determination result of the present invention is not limited thereto.

For example, the imaging scene determination result may be presented to the user on a display unit. In addition, the imaging scene determination auxiliary information may be used to control the correction processing on the image signal. More specifically, a correction amount on the image signal is controlled according to the imaging scene determination auxiliary information.

For example, when the imaging scene determination result does not coincide with the imaging scene of the imaging scene determination auxiliary information, the imaging scene may be erroneously determined. When the imaging scene is erroneously determined, if the image signal is corrected according to the imaging scene determination result, image quality of the captured image may be deteriorated.

In order to prevent the image data from being deteriorated, when the imaging scene determination result does not coincide with the imaging scene of the imaging scene determination auxiliary information, compared with the case when they coincide with each other, the correction amount for the image signal may be controlled to set to a smaller value.

With this arrangement, when the imaging scene may be erroneously determined, the image quality of the captured image can be prevented from being extremely deteriorated. Further, when the imaging scene is not erroneously determined, the optimum correction processing for the imaging scene can be performed.

According to the above-described exemplary embodiment, when controlling the imaging scene determination processing, the imaging scene determination threshold value of the imaging scene having the high imaging frequency is set low, however, content for controlling the imaging scene determination processing of the present invention is not limited thereto.

For example, the imaging scene determination threshold value of the imaging scene having the low imaging frequency may be set higher than the reference value. In other words, since the imaging scene having the low imaging frequency is probably inappropriate for the current imaging environment, it is set to be barely selected as the imaging scene determination result. With this arrangement, the imaging scene determination result barely becomes the imaging scene inappropriate for the imaging environment.

Further, a priority order among the imaging scenes may be controlled. More specifically, the priority among the imaging scenes is previously set, and when two or more imaging scene conditions are satisfied, from among the imaging scenes satisfying the imaging scene conditions, the imaging scene having the highest priority is selected as the current imaging scene.

At this point, the priority of the imaging scene received as the imaging scene determination auxiliary information is set higher than the previously set priority. With this arrangement, the imaging scene having the high evaluation is easily selected, and thus the imaging scene can be determined according to the user's intention.

Further, during the preview, the imaging scene determination processing is sequentially performed on each input frame image, the imaging scene determination result of a plurality of frame images are summed up to determine the current imaging scene, and then the determination condition may be controlled.

For example, only when the same imaging scene determination result is continuously acquired on the predetermined number of frames, the current imaging scene is specified, and then the conditions for the above-described number of frames may be controlled. In other words, when the imaging scene received as the imaging scene determination auxiliary information is specified, a threshold value of the number of frames may be set lower than usual. With this arrangement, the imaging scene having the high evaluation can be easily selected, and thus the imaging scene can be determined according to the user's intention.

According to the first exemplary embodiment, the information about the imaging scene having the high evaluation is acquired from the external image server as the imaging scene determination auxiliary information. Hereinbelow, according to a second exemplary embodiment of the present invention, the imaging scene determination auxiliary information is generated from camera setting parameters (imaging control parameters).

Since the imaging system and configuration of the imaging apparatus are the same as those of the first exemplary embodiment illustrated in FIGS. 1 and 2, the detailed description is not repeated herein.

Figure 8:
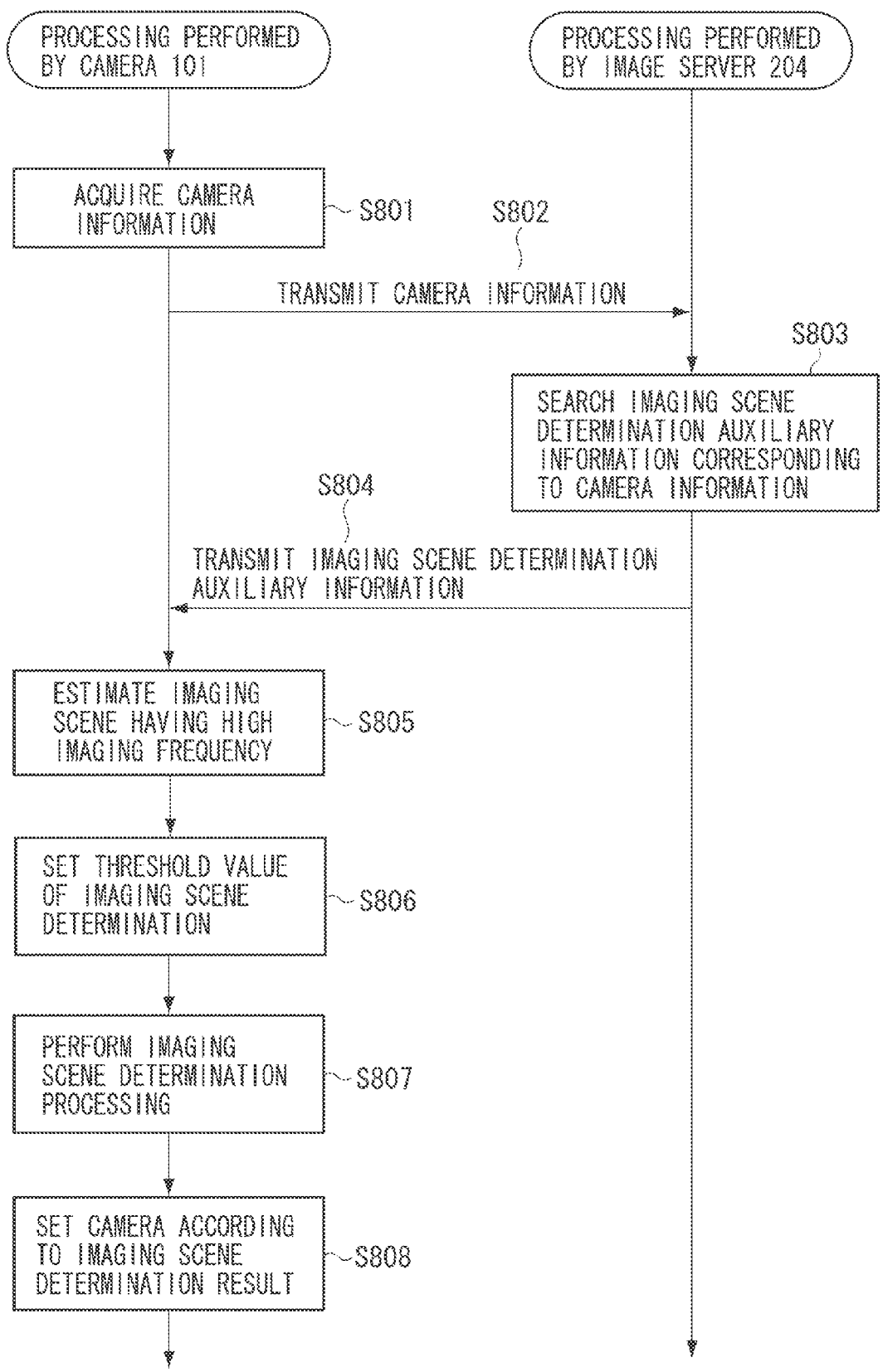
FIG. 8 is a sequence diagram illustrating a processing operation of an imaging system according to a second exemplary embodiment of the present invention.

Next, the processing operation of the imaging apparatus according to the second exemplary embodiment will be described. FIG. 8 is a flowchart illustrating a flow of the processing operation related to the imaging scene determination processing according to the present exemplary embodiment. Compared with the first exemplary embodiment illustrated in FIG. 3, the processing for determining the imaging scene having the high evaluation in step S805 is added.

Since a series of the processing in steps S801 and S802 is the same as that in steps S301 and S302 illustrated in FIG. 3 according to the first exemplary embodiment, the detailed description thereof is not repeated herein.

In step S803, in the same manner as step S303, the image DB search unit 207 of the image server 204 searches the imaging scene determination auxiliary information corresponding to the received camera information.

FIG. 9A illustrates an example format of the image data recorded in the image DB 206. According to the first exemplary embodiment illustrated in FIG. 4, the camera information is associated with the information about the imaging scene. According to the present exemplary embodiment illustrated in FIG. 9A, the camera information is associated with the camera setting parameters. The camera setting parameters herein refer to the parameters set for the camera when the reference image has been captured.

Upon receiving the camera information and the search request of the imaging scene determination auxiliary information from the camera 101, the image DB search unit 207 searches the image DB 206 for the image data corresponding to the camera information received from the camera 101.

More specifically, the image DB search unit 207 searches for and extracts the image data having the location information and the time information coinciding with or close to those received from the camera 101. The image DB search unit 207 outputs the extracted image data to the image server control unit 205.

Based on the extracted image data, the image server control unit 205 determines the imaging scene determination auxiliary information to be transmitted to the camera 101. More specifically, the image server control unit 205 determines the camera setting parameter having a high usage frequency of the extracted image data, and then transmits the evaluation information about the camera setting parameter to the camera 101.

In other words, the higher evaluation is given to the camera setting parameter having the high usage frequency (first imaging control parameter) compared with the camera setting parameter having the low usage frequency (second imaging control parameter) to generate the evaluation information about the camera setting parameter.

For example, if FIG. 9A illustrates the image data extracted based on a certain camera information, it indicates that six extracted pieces of data include three pieces of image data captured in a sunlight mode as a white balance setting, which have the highest usage frequency and the high evaluation. Similarly, regarding the focus position, the six extracted pieces of data include four pieces of image data set in the distance, which have the highest usage frequency and the high evaluation.

Alternatively, the range of the camera setting parameter having the high usage frequency may be determined. For example, regarding the exposure time, the range between $1/250$ and $1/500$ includes high usage frequency and the high evaluation. Regarding an aperture value, the range between 7.1 and 8.0 includes the high usage frequency and the high evaluation. FIG. 9B illustrates an example of the camera setting extracted as described above.

In step S804, the image server control unit 205 transmits the determined imaging scene determination auxiliary information to the camera 101.

In step S805, based on the camera setting parameter received as the imaging scene determination auxiliary information, the imaging scene determination control unit 112 estimates the imaging scene having the high evaluation. For this purpose, the imaging scene determination control unit 112 reads the camera setting parameter appropriate for each imaging scene from the camera control unit 110. FIG. 9C illustrates an example of the read camera setting parameters.

Next, from among imaging scenes, the imaging scene is extracted that has the value of the camera setting parameter coinciding with or close to that having the high usage frequency illustrated in FIG. 9B. For example, in FIG. 9C, the two imaging scenes of the sunset sky and the blue sky coincide with the camera setting parameter having the high usage frequency. Accordingly, it can be determined that the imaging scene having the high usage frequency is the sunset sky or the blue sky.

The imaging scene determination control unit 112 estimates the imaging scene having the high imaging frequency as described above, and then, based on the result, calculates the imaging scene determination threshold value to be used for the imaging scene determination processing. Since the calculation of the imaging scene determination threshold value and the processing contents subsequently performed in steps S806 to S808 herein are the same as those in steps S305 to S307 illustrated in FIG. 3 according to the first exemplary embodiment, the detailed description thereof is not repeated herein.

As described above, according to the present exemplary embodiment, the imaging apparatus that determines the imaging scene based on the image signal acquires the auxiliary information to be used for the imaging scene determination from the external database and then, based on the auxiliary information, controls the imaging scene determination processing.

Particularly, according to the present exemplary embodiment, as the imaging scene determination auxiliary information, the information about the camera setting parameters having the high usage frequency is received and then, based on the information, the imaging scene having the high evaluation is estimated to control the imaging scene determination. With this arrangement, even when the information stored in the external database does not include the information about the imaging scene (imaging mode), the imaging scene can be determined with high accuracy.

According to the first and second exemplary embodiments, during the image preview, the imaging scene determination processing is repeatedly controlled. Hereinbelow, according to a third exemplary embodiment of the present invention, whether to make an inquiry about the imaging scene determination auxiliary information at the external image server will be described.

Since the imaging system and the configuration of the imaging apparatus according to the present exemplary embodiment are similar to those illustrated in FIGS. 1 and 2 according to the first exemplary embodiment, the detailed description is not repeated herein.

Figure 10:
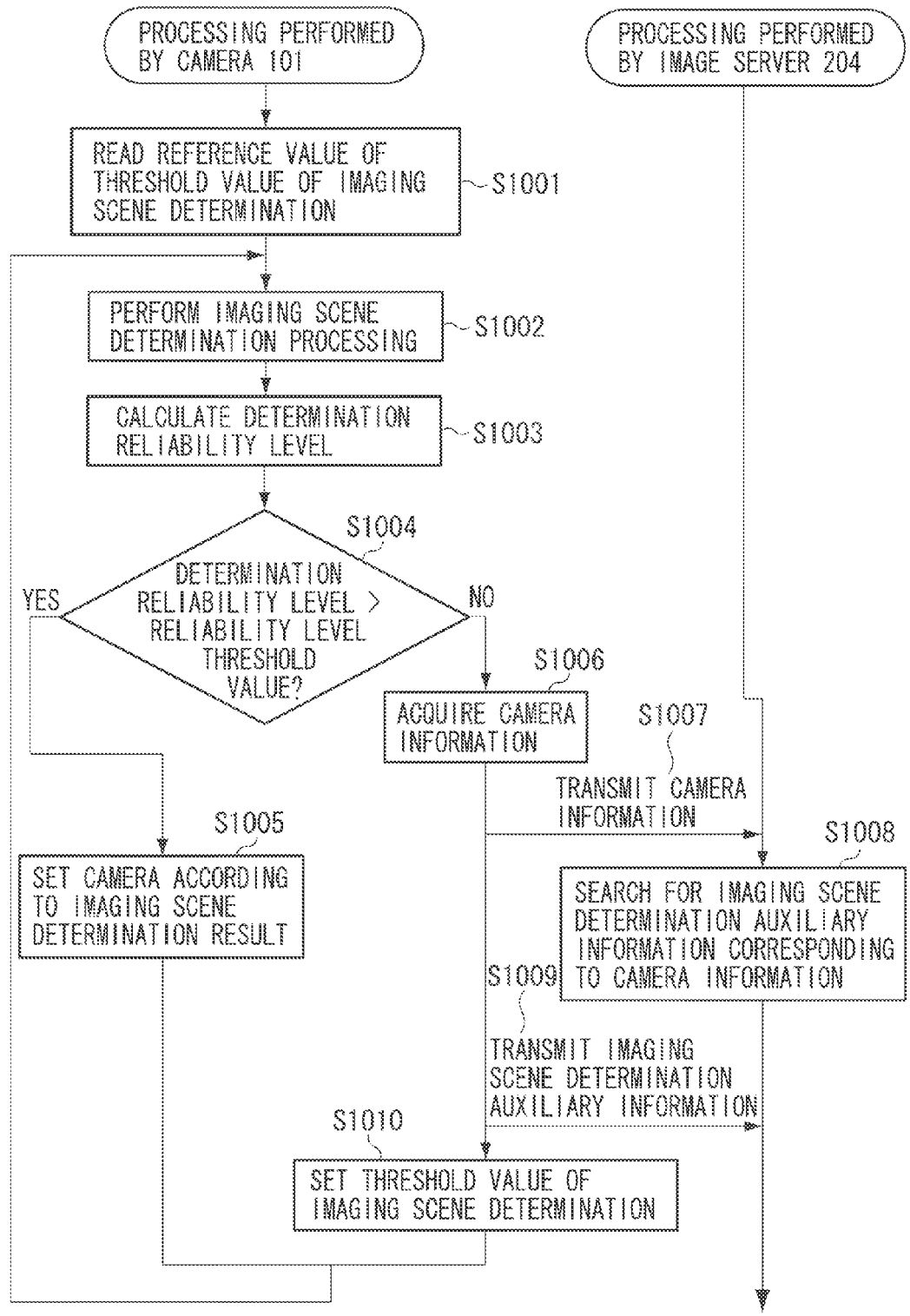
FIG. 10 is a flowchart illustrating a flow of control of imaging scene determination processing according to the third exemplary embodiment of the present invention.

Next, the processing operation of the imaging apparatus according to the third exemplary embodiment will be described. FIG. 10 is a flowchart illustrating a flow of the processing operation related to the imaging scene determination processing according to the present exemplary embodiment. A series of the operations described above are repeatedly performed according to the control of the camera control unit 110 during the image preview.

First, in step S1001, the imaging scene determination control unit 112 reads from a memory the reference value of the determination threshold value for each imaging scene that has been previously set (not illustrated), and then outputs the reference value to the imaging scene determination unit 111.

In step S1002, the imaging scene determination unit 111 performs the imaging scene determination processing using the input imaging scene determination threshold value. Since the content of the determination processing herein is the same as that of the first exemplary embodiment described with reference to FIG. 5, the detailed description thereof is not repeated herein.

In step S1003, the imaging scene determination unit 111 calculates the imaging scene determination reliability level that indicates the reliability level of the imaging scene determination, and outputs it to the camera control unit 110. A method for calculating the imaging scene determination reliability level will be described below.

In step S1004, the camera control unit 110 compares the calculated imaging scene determination reliability level with a previously set threshold value of the imaging scene determination reliability level. When the imaging scene determination reliability level is higher than the threshold value (YES in step S1004), the processing proceeds to step S1005. When the imaging scene determination reliability level is lower than the threshold value (NO in step S1004), the processing proceeds to step S1006.

In step S1005, similarly to step S307 illustrated in FIG. 3, the camera control unit 110 instructs each unit of the camera 101 to perform the correction processing on the image signal according to the imaging scene determination result.

In steps S1006 to S1010, the camera 101 acquires the imaging scene determination auxiliary information from the image server, and controls the imaging scene determination. Since a series of the processing operations herein are the same as those in steps S301 to S305 illustrated in FIG. 3, the detailed description thereof is not repeated herein.

Subsequently, the processing returns to step S1002 and a series of the following processing operations later than step S1002 are repeatedly performed. Thus, in the imaging scene determination processing performed for the second time or later, the imaging scene determination threshold value, which is determined based on the imaging scene determination auxiliary information, is used.

Next, the method for calculating the reliability level for determining the imaging scene by the imaging scene determination unit 111 will be described. According to the present exemplary embodiment, the imaging scene determination reliability level is calculated based on comparison between the feature amount and the imaging scene determination threshold value of the image.

For example, when the imaging scene determination result is the sunset sky, if the sunset color blocks account for a whole image, it is considered that the reliability level of the imaging scene is high. Other imaging scenes are considered in a similar manner, and the reliability level is defined by the following equation.

Reliability level (sunset sky)=sunset color blocks ratio−Threshold value of sunset color block ratio Reliability level (blue sky)=blue sky color blocks Ratio−Threshold value of blue sky color block ratio Reliability level (night view)=night view blocks ratio−Threshold value of night view block ratio Reliability level (portrait)=Size of main face−Threshold value of face size The imaging scene determination unit 111, using the above-described equations, calculates the reliability level of the imaging scene selected in step S1002, and outputs it to the camera control unit 110.

As described above, according to the present exemplary embodiment, the imaging apparatus that determines the imaging scene based on the image signal acquires the auxiliary information to be used for the imaging scene from the external database, and controls the imaging scene determination processing based on the auxiliary information.

In addition, according to the present exemplary embodiment, the reliability level for determining the imaging scene is calculated and, only when the reliability level is lower than the predetermined threshold value, the imaging apparatus communicates with the external server, and controls the imaging scene determination processing. Thus, the workload for the processing performed by the external server and the imaging apparatus can be decreased.

According to the present exemplary embodiment, the method for calculating the reliability level of the imaging scene determination is performed based on the block ratio, however, the method for calculating the reliability level of the present invention is not limited thereto. In other words, as long as the method evaluates the reliability level of the imaging scene determination processing performed according to the feature of the image, any method may be used.

For example, when a certain imaging scene is determined, if a plurality of determination conditions are used, the reliability level maybe calculated according to the number of the satisfied determination conditions. In this case, the more the number of the determination conditions are satisfied, the higher the reliability level is calculated.

Alternatively, when a plurality of types of objects or a plurality of types of features of the imaging scenes are detected, the imaging scene determination reliability level may be calculated low. For example, when the imaging scene determination result is the sunset sky, if the blue sky color block is included at a time, or if the person's face having the size smaller than the threshold value is detected, the reliability level for determining the imaging scene determination result to be the sunset sky is considered low.

Therefore, when the above-described conditions are satisfied, the reliability level may be calculated low. With this arrangement, the reliability level for determining the imaging scene can be calculated with high accuracy.

The purpose of the present invention can be also achieved as below. In other words, the system or the apparatus is provided with a storage medium that records a program code of software in which a procedure is described for realizing the function of each above-described embodiment. A computer (or central processing unit (CPU), micro processing unit (MPU)) of the system or the apparatus reads the program code stored in the storage medium and performs it.

In this case, the program code itself read from the storage medium realizes a new function of the present invention, and the storage medium and the program that store the program code constitute the present invention.

Further, the storage medium for providing the program code includes, for example, a flexible disk, a hard disk, an optical disk, an optical magnetic disk. Further, a compact disk-read only memory, a CD-recordable, a CD-rewritable, a digital versatile disc-read only memory, a DVD-random access memory, a DVD-RW, a DVD-R, a magnetic tape, a non-volatile memory card, and a ROM can be used.

Furthermore, when the program code read by the computer is performed, the function of each above-described exemplary embodiments can be realized. Furthermore, the present invention also includes a case where, based on an instruction of the program code, an operation system (OS) running on the computer performs a part of or all of the actual processing and thus the function of each above-described exemplary embodiment can be realized by the processing.

Moreover, the present invention also includes the following case. First, the program code read from the storage medium is written into a memory included in a function extension board inserted into the computer or a function extension unit connected thereto. Subsequently, based on the instruction of the program code, the CPU included in the function extension board or the function extension unit performs a part of or all of the actual processing.

Aspects of the present invention can also be realized by a computer of a system or apparatus [or devices such as a CPU or MPU] that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device [e.g., computer-readable medium]. In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-247859 filed Nov. 4, 2010, which is hereby incorporated by reference herein in its entirety.

What is claimed is:

1. An imaging apparatus comprising:
   an imaging unit configured to capture an object image and output image data;
   a determination unit configured to, based on the image data, perform determination processing for determining an imaging scene of the image data output from the imaging unit;
   an acquisition unit configured to acquire imaging information related to a condition for capturing the image data;
   a communication unit configured to transmit the imaging information to an external device and receive auxiliary information for supporting determination of the imaging scene of the image data corresponding to the imaging information;
   a control unit configured to control an operation of each unit of the imaging apparatus to be appropriate for imaging the image scene determined by the determination unit; and
   a calculating unit configured to calculate a reliability level of the determined imaging scene and compare the calculated reliability level with a predetermined reliability level of the determined image scene,
   wherein if the calculated reliability level is greater than the predetermined reliability level, the imaging scene is set according to the determination result, and
   if the calculated reliability level is not greater than the predetermined reliability level, the determination unit performs second determination processing based on the image data and the auxiliary information, and the imaging scene is set according to the second determination result.

2. The imaging apparatus according to claim 1, wherein the determination unit is configured to calculate an image feature amount from the image data, perform the determination processing by comparing the image feature amount with a determination threshold value, and correct the image feature amount or the determination threshold value according to the auxiliary information to perform the determination processing.

3. The imaging apparatus according to claim 1, wherein the imaging information includes at least one of direction information indicating an imaging direction of the image data captured by the imaging apparatus, date information indicating a date when captured, time information indicating an imaging time, and field of view information indicating an imaging region.

4. The imaging apparatus according to claim 1, wherein the auxiliary information includes evaluation information about the imaging scene corresponding to the imaging information.

5. The imaging apparatus according to claim 4, wherein the evaluation information about the imaging scene refers to the information in which, based on a plurality of pieces of data corresponding to the imaging information stored in the external device, higher evaluation is given to a first imaging scene having a high imaging frequency under a condition specified by the imaging information than a second imaging scene having an imaging frequency lower than that of the first imaging scene.

6. The imaging apparatus according to claim 1, wherein the auxiliary information includes evaluation information about an imaging control parameter of the imaging unit corresponding to the imaging information.

7. The imaging apparatus according to claim 6, wherein the evaluation information about the imaging control parameter refers to the information in which higher evaluation is given to a first imaging control parameter having a high imaging frequency under a condition specified by the imaging information than a second imaging control parameter having a imaging frequency lower than that of the first imaging control parameter.

8. The imaging apparatus according to claim 4, wherein the determination unit is configured to correct a threshold value for determining the determination processing to select the imaging scene having high evaluation in the evaluation information about the imaging scene.

9. The imaging apparatus according to claim 1, wherein the determination unit is configured to, when calculating an image feature amount from the image data and determining the imaging scene of the image data by comparing the image feature amount with a predetermined determination threshold value, correct a determination threshold value or the image feature amount corresponding to the imaging scene having high evaluation so that the imaging scene having the high evaluation is selected with the auxiliary information.

10. The imaging apparatus according to claim 1,
    wherein the determination unit is configured to determine the imaging scene based on a previously set priority of the imaging scene; and
    wherein the control unit is configured to raise the priority of the imaging scene corresponding to the imaging scene having high evaluation so that the imaging scene having the high evaluation is easily selected with the auxiliary information.

11. The imaging apparatus according to claim 1,
    wherein the determination unit is configured to calculate a reliability level of a determination result in the determination processing; and wherein the communication unit is configured to, when the reliability level is lower than a predetermined threshold value of the reliability level, communicate with the external device to acquire the auxiliary information.

12. The imaging apparatus according to claim 1, further comprising a correction unit configured to correct the image data according to a determination result of the determination unit,
    wherein a correction amount for the image data by the correction unit is determined based on the auxiliary information.

13. An imaging system including an imaging apparatus and an information processing apparatus, the imaging system comprising:
    an imaging unit configured to capture an object image and output image data;
    a determination unit configured to perform determination processing for determining an imaging scene of the image data output from the imaging unit based on the image data;
    an acquisition unit configured to acquire imaging information related to an imaging condition of the image data;
    a communication unit configured to perform communication between the imaging apparatus and the information processing apparatus, and transmit the imaging information from the imaging apparatus to the information processing apparatus, and auxiliary information for supporting determination of the imaging scene of the image data corresponding to the imaging information from the information processing apparatus to the imaging apparatus;
    a generation unit configured to generate the auxiliary information based on the imaging information and a plurality of pieces of data capable of being associated with the imaging information stored in a storage medium;
    a control unit configured to control an operation of each unit of the imaging apparatus to be appropriate for imaging the image scene determined by the determination unit; and
    a calculating unit configured to calculate a reliability level of the determined imaging scene and compare the calculated reliability level with a predetermined reliability level of the determined image scene,
    wherein if the calculated reliability level is greater than the predetermined reliability level, the imaging scene is set according to the determination result, and
    if the calculated reliability level is not greater than the predetermined reliability level, the determination unit performs second determination processing based on the image data and the auxiliary information, and the imaging scene is set according to the second determination result.

14. The imaging system that includes an imaging apparatus and an information processing apparatus according to claim 13, wherein the plurality of pieces of data are each associated with location information indicating an imaging location, time information indicating an imaging time, and an imaging scene, and stored.

15. The imaging system that includes an imaging apparatus and an information processing apparatus according to claim 13, wherein the plurality of types of data are each associated with the image data, location information indicating a location where the image data is captured, time information indicating an imaging time, and an imaging scene determined when the image is captured, and stored.

16. A method for controlling an imaging apparatus which includes an imaging unit for capturing an object image and outputs image data, a determination unit that performs determination processing for determining an imaging scene of the image data output from the imaging unit based on the image data, the method comprising:
    acquiring imaging information related to an imaging condition of the image data;
    transmitting the imaging information to an external device;
    receiving from the external device auxiliary information for supporting determination of an imaging scene of the image data corresponding to the imaging information;
    controlling an operation of each unit of the imaging apparatus to be appropriate for imaging the image scene determined by the determination unit; and
    calculating a reliability level of the determined imaging scene and compare the calculated reliability level with a predetermined reliability level of the determined image scene,
    wherein if the calculated reliability level is greater than the predetermined reliability level, the imaging scene is set according to the determination result, and
    if the calculated reliability level is not greater than the predetermined reliability level, the determination unit performs second determination processing based on the image data and the auxiliary information, and the imaging scene is set according to the second determination result.

* * * * *